March 6, 1934.  W. L. HAWK  1,949,908
WEIGHT INDICATING DEVICE FOR WELL DRILLING APPARATUS
Filed Aug. 19, 1929   3 Sheets-Sheet 2
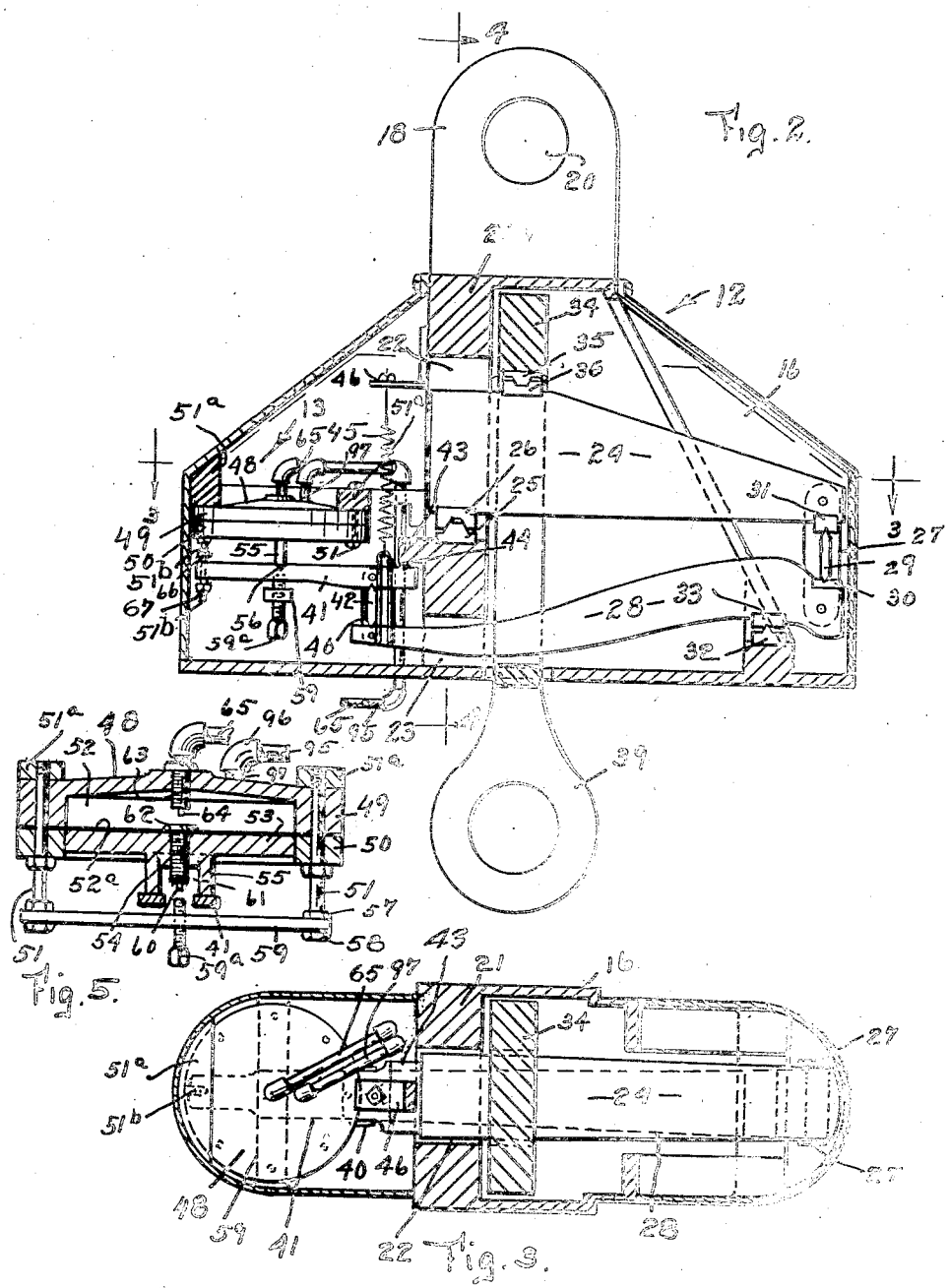
INVENTOR
Walter L. Hawk

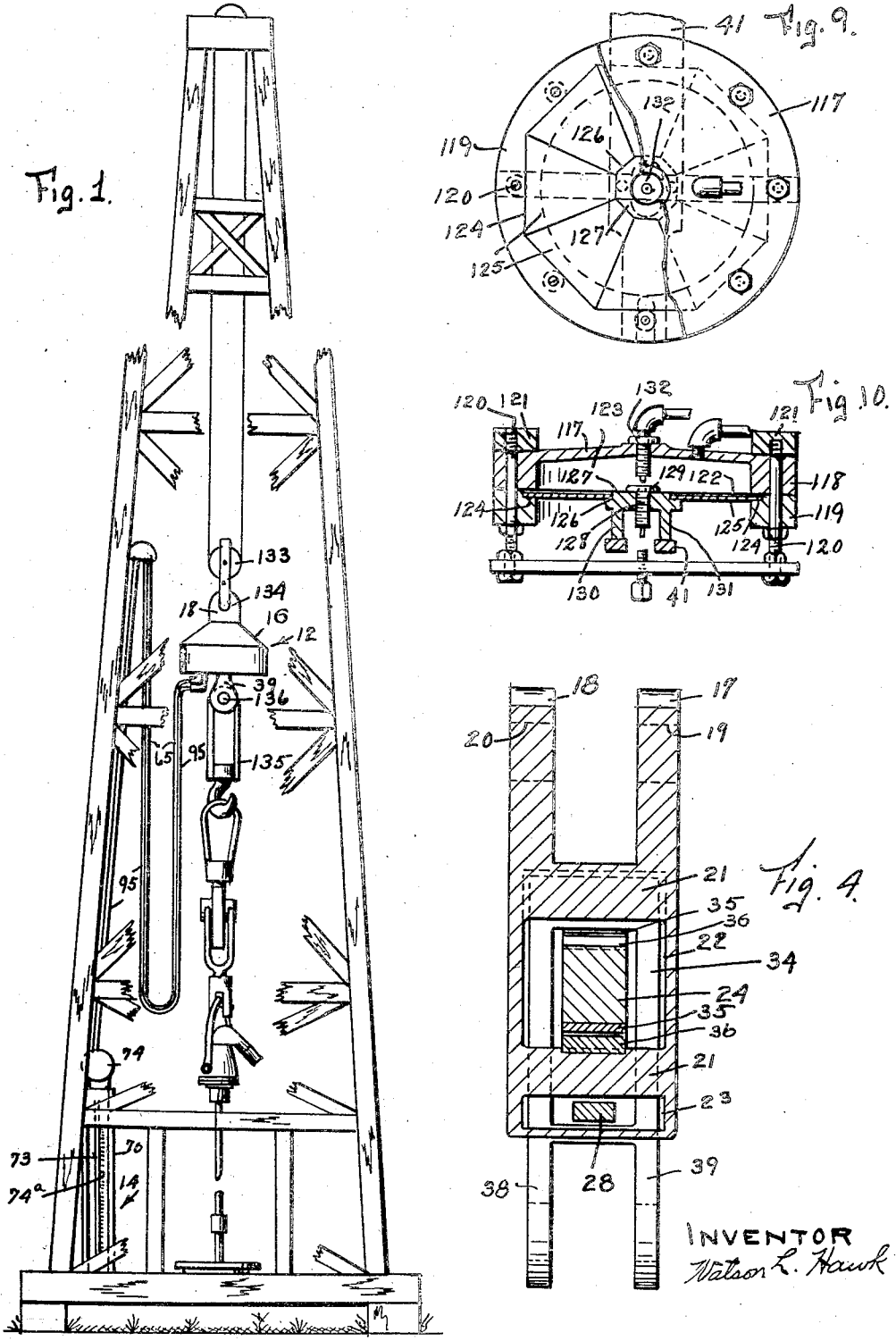

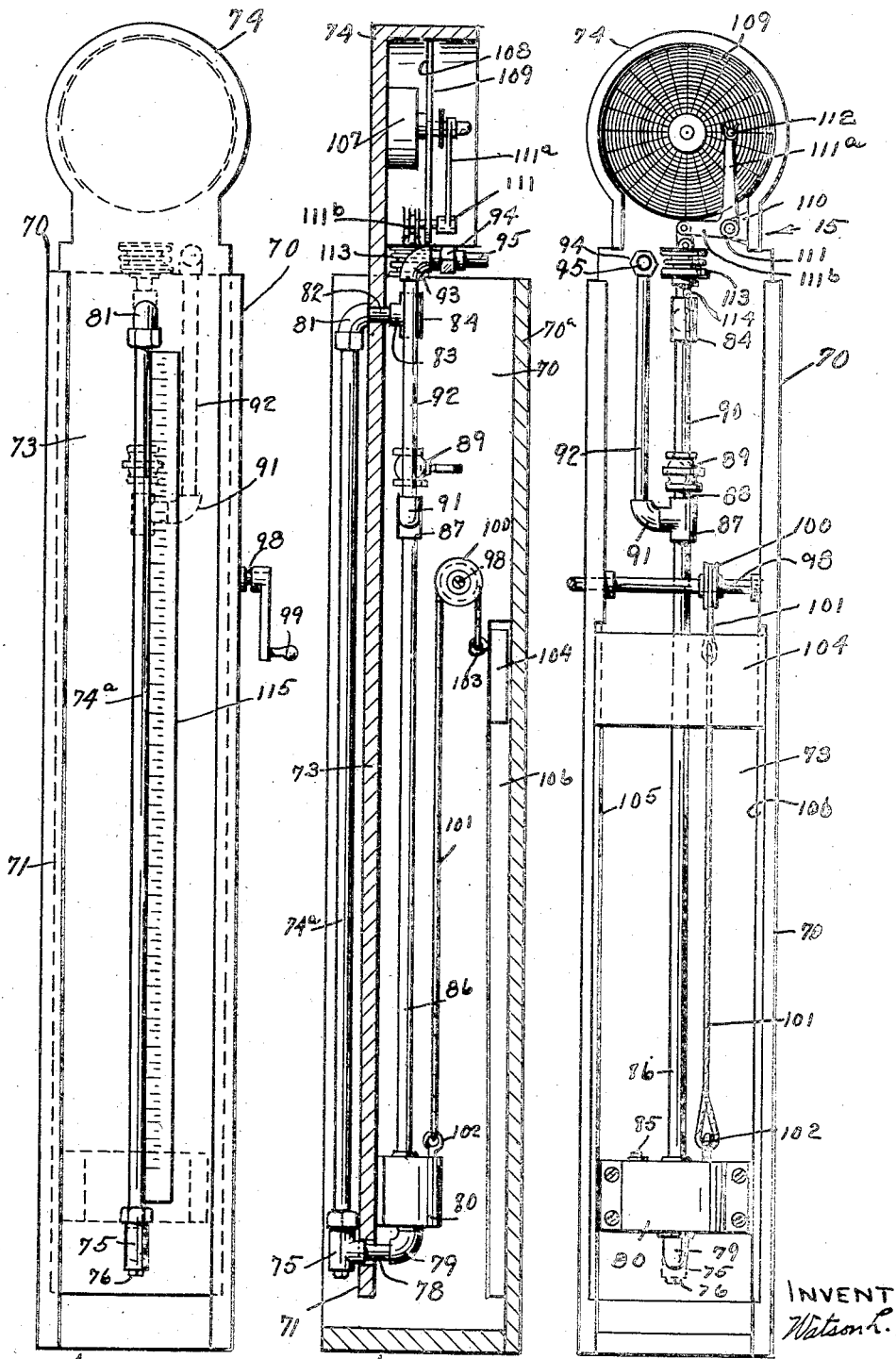

Patented Mar. 6, 1934

1,949,908

UNITED STATES PATENT OFFICE 1,949,908

WEIGHT INDICATING DEVICE FOR WELL DRILLING APPARATUS

Watson L. Hawk, Long Beach, Calif.

Application August 19, 1929, Serial No. 387,061

3 Claims. (Cl. 265—47)

My invention relates primarily to a weight indicating device intended for use in connection with oil well drilling apparatus and it has for its prime object the provision of a mechanism of this character which will enable the driller to regulate the pressure upon the drill bit so as to obtain the maximum efficiency in cutting the various formations, as well as to prevent overloading the drill and prevent the danger of breakage or other damage to said drill.

Another object is to provide mechanism whereby the weight of the drill string will be visually indicated at all times which can be readily incorporated in the well drilling equipment now commonly employed in rotary rigs without in any way altering the same.

A still further object is to provide in mechanism of the above character means for indicating a correct daily record of the live weight or working loads on the drill string, and at the same time a record of the performance of the drilling crew or crews during a predetermined period of time.

Other objects and advantages will appear hereinafter and, while I have shown and will describe the preferred form of my invention, it will be understood that I do not limit myself to such preferred form but that various changes and adaptations may be made therein without departing from the spirit of my invention.

In the drawings accompanying and forming a part hereof:

Fig. 1 is a view in elevation, partly broken away, of the head works of a rotary drilling rig showing my invention applied thereto.

Fig. 2 is an enlarged vertical central section, partly in elevation, of the weighing mechanism of my device.

Fig. 3 is a section on the line 3—3 of Fig. 2.

Fig. 4 is a section on the line 4—4 of Fig. 2.

Fig. 5 is a transverse section through the indicator mechanism control of my device, detached from its place of use.

Fig. 6 is a front elevation of the indicating and recording mechanism.

Fig. 7 is a vertical section through Fig. 6, taken at a right angle thereto and with parts in elevation, for clearness of illustration.

Fig. 8 is a rear view of Fig. 6, with the rear cover or wall removed to permit an interior view.

Fig. 9 is a top plan, partly broken away, of another form of indicator mechanism control.

Fig. 10 is a horizontal section through Fig. 9, partly in elevation.

Referring to the drawings my invention comprises broadly the weighing mechanism 12, the indicator control mechanism 13, the indicator mechanism 14, and the recording mechanism 15.

Weighing mechanism

The weighing mechanism comprises a housing 16, substantially oblong shaped in top plan from the top wall of which project upwardly, spaced ears 17 and 18 through which are provided openings 19 and 20 by means of which said housing is suspended. Provided within housing 16 is a vertical partition 21 and through this partition are provided superposed openings 22 and 23 preferably rectangular. A beam 24 has one end rockably supported upon the lower wall of the opening 22 by means of the pivot blocks 25 and 26 and has its other end loosely connected by links 27 to one end of the lever 28, a knife edged bearing member 29, preferably of hardened steel, being positioned between these ends to maintain the same in their proper spaced relation, hardened bearing blocks 30 and 31 being provided for the knife edges of said member 29, the object of which will be obvious. Lever 28 is rockably supported near its connection to the beam 24 upon the bottom wall of housing 16, by means of the knife edged pivot block 32 and the recessed block 33. A yoke 34 is mounted within the housing 16 to extend parallel to the partition 21 and straddles the beam 24 and is supported thereby through the medium of the bearing blocks 35 and 36. The lower end of the yoke 34 projects through an aperture in the bottom wall of the housing 16 and then terminates in a pair of spaced ears 38 and 39 which provide means of connection to the tool string.

The opposite or inner end of the lever 28 is loosely connected by the links 40 to the inner end of the indicator control lever 41, a knife edged bearing member 42 being interposed therebetween to maintain proper spaced relation. Projecting from the outer face of the partition 21, at the lower edge of the opening 22 is an abutment 43 on the under face of which is provided a knife edged bearing 44 which provides a bearing for the inner end of the indicator control lever 41. A coil spring 45 having its lower end connected to the inner end of lever 28 and its upper end connected to a bracket 46 rigidly secured to the partition 21 serves to counterbalance the weight of the levers and maintain equilibrium between the parts when the device is inactive.

Indicator control mechanism

The indicator control mechanism comprises an annular body member 48 provided with a downwardly depending annulus 49, to the lower face of which is bolted an annular ring 50 by means of bolts 51. The upper ends of the bolts 51 are screw threaded into ears or brackets 51a forming part of the housing 16. Interposed between the annulus 49 and the ring 50 is the diaphragm 52a preferably of rubber, although any other suitable material may be used, the edge of which is securely clamped between said annulus and ring forming an air tight compartment within said body member 48.

Mounted within the annular ring 50, concentric therewith, is a piston 53, movable vertically and, depending downwardly from the under face thereof is a pair of spaced legs 54 and 55, the lower ends of which are beveled and rest within V-shaped recesses 56 in the upper face of the lever 41. Two of the opposed bolts 51 project downwardly for a distance and are screw threaded, and adjustably mounted upon these ends by means of nuts 57 and 58 is a cross bar 59, adjustably supporting centrally of its length, in which is mounted a set screw 59a the upper end of which is adapted to be contacted by the lower end of the valve stem 60 of the Schrader valve 61 upon the downward movement of the piston 53 to open said valve and permit air to escape from compartment 52 as hereinafter explained. The Schrader valve 61 is screw threadedly mounted in the piston 53 centrally thereof, and its head 62 serves to rigidly secure the diaphragm at its center to the piston 53. In lieu of the Schrader valve any other suitable valve may be used.

A similar valve 63 is screw threadedly mounted in the top wall of the body member, centrally thereof, and is so positioned that the projecting end of the valve stem 64 will be engaged by the head 62 of the valve 61 upon the upward movement of the piston 53. Valve 63 is connected by a pipe 65 to any suitable air supply (not shown). The free end of the lever 41 is bifurcated and straddles the downwardly projecting bolt 51a, nuts 66 and 67 being provided to adjustably limit the movement of the said free end.

Indicator mechanism

The indicator mechanism comprises a vertically extending, substantially rectangular housing 70, the front side and top of which is open and the rear side being closed by a detachable closure 70a. Provided in opposite sides, and on the inner faces thereof, of this casing, near the front are opposed registering guideways 71 and 72 which extend vertically, and slidably mounted in these guideways to slide vertically is a panel 73 upon the upper end of which is secured a hood 74, circular in front elevation. Mounted upon the front face of panel 73, preferably centrally of its width, is a gage glass 74a preferably of glass or other suitable transparent material, the lower end of which is detachably connected to a T 75, the lower end of which T is closed by a plug 76. The side opening 77 of the T 75 projects through an aperture in the panel 73 and is connected by a nipple 78 to an L 79, which L is in turn connected to the bottom of the reservoir 80. The upper end of the tube 74a is detachably connected to an L 81, which L is connected by a nipple 82 passing through an aperture in panel 73 to the side opening 83 of a T 84. Reservoir 80 has provided in its top wall a suitable filler opening closed by a plug 85. Connected to the top wall of reservoir 80 centrally thereof and extending upwardly therefrom is an air inlet pipe 86, the upper end of which is connected to the lower opening of a T 87, the upper end of which is connected by a nipple 88 to a pet cock 89. The other side of the pet cock 89 is connected by a pipe 90 to the lower opening of the T 84. The side opening of the T 87 is connected by an L 91 to an upwardly extending pipe 92 upon the upper end of which is mounted an L 93 and a union coupling 94, which coupling is adapted to be connected by a flexible pipe or tube 95 to the air compartment 52 by means of the L 96 and nipple 97.

Rotatably mounted at its ends in the walls of the housing 70 at a suitable distance from the lower end thereof, is a shaft 98, one end of which projects outwardly and terminates in a handle 99 by means of which said shaft may be rotated. Rigidly secured upon said shaft within said housing is a sheave 100 over which passes a cable 101. One end of cable 101 is secured to an eye 102 projecting upwardly from the top wall of reservoir 80, and the other end is connected by an eye 103 to a counterweight 104 slidably mounted in guideways 105 and 106 in the inner faces of the side walls of casing 70, whereby as shaft 98 is rotated by means of the handle 99, cable 101 will be drawn over wheel 100 and will elevate panel 73 and lower counterweight 104, or vice versa, according to the direction of rotation of said shaft.

Recording mechanism

Securely mounted upon the inner face of the front wall of the hood 74, centrally thereof is a spring motor 107, such as a clock motor, the main shaft or pintle of which is adapted to rotate once during a twenty four hour, or other desirable period, and rigidly mounted upon this pintle is a disc 108 adapted to have removably mounted upon the face thereof, in the usual well known manner, a recording chart 109. Projecting inwardly from one of the side walls of the hood 74 is a bearing bracket 110 and pivotally mounted in this bracket is a substantially bell crank-shaped lever 111, one leg 111a of which extends upwardly and carries upon its upper end a recording pen 112, of the usual type, and the other leg 111b is pivotally connected at its end to the upper end of an expanding bellows 113. The lower end of the bellows 113 is connected by a nipple 114 to the upper end of the T 84.

If found necessary or desirable, bellows 113 may be operatively connected at its lower end to the air supply pipe instead of to the T 84.

Mounted upon the front face of the panel 73 at the side of the gage glass 74a is an indicating graduated scale 115 upon the face of which are provided indicia or graduations 116 which indicate the height of the fluid within the gage glass.

If the fluid within gage 74a should overflow at the top it will pass through the L and T at the upper end thereof into pipe 90 above the pet cock 89. Opening said cock 89 will then permit the fluid to flow downwardly through pipe 86 into the reservoir 80.

In Figs. 9 and 10 I have shown another form of indicator control mechanism. This form comprises an annular body member 117 provided with a downwardly depending annulus 118, to the lower face of which is detachably secured an annular ring 119 by means of bolts 120, the upper end of these bolts being securely anchored in ears or brackets 121 forming part of housing 16. A diaphragm 122 is interposed between the annulus 118 and the ring 119, its edge being clamped therebetween and forms an air tight chamber 123 within the body member 117. Formed in the upper face of the ring 119 around the inner periphery thereof is an octagonal recess 124 and in this recess are loosely mounted the outer ends of the triangular segments 125. While I have shown in the present instance an octagonal recess and eight segments, I wish it to be specifically understood that I do not limit myself to any specified number of segments or particular shape of recess. The inner ends of the segments 125 are positioned within a recess 126 extending around the outer edge of the upper face of a center bearing member 127 in which is screw-threadedly mounted, centrally thereof, a Schrader valve 128, the head 129 of which acts to rigidly secure the diaphragm 122 at its center to the said center bearing 127. Bearing 127 has provided on its under face a pair of spaced downwardly extending legs 130 and 131 which rest upon the upper face of the lever 41. A Schrader or other similar valve 132 is screw threadedly mounted in the top wall of body member 117.

In all other essential details the construction is similar to the construction of the preferred form of my indicator control mechanism.

Operation

In the operation of my device the parts will normally lie in the positions shown with a suitable supply of mercury or other suitable material in the reservoir 80. The housing 16 will be suspended from the travelling sheave 133 of the crown block by means of the ears 17 and 18 and pin 134, and the swivel hook 135 will be suspended from the ears 38 and 39 by means of the pin 136.

The weight suspended from the yoke 34 tends to cause the same to yield downwardly and thus rock the beam 24 upon the pivots 25 and 26 and cause the outer end of said beam to move downwardly which will, through the medium of the bearing member 29, depress the outer end of the lever 28 and elevate the other end thereof. As the inner end of lever 28 moves upwardly it will, through the medium of the bearing 42, rock the lever 41 on its pivot 44 and move the free end of said lever 41 upwardly. The upward movement of the lever 41 will, by means of the legs 54 and 55 of the piston 53 resting thereon, move said piston 53 upwardly, thus forcing the air within chamber 52 out through pipe 95 and pipe 86 into the top of the reservoir 80, and forcing the mercury out of said reservoir into the gage glass 74a at the bottom and thence upwardly in said gage glass. The distance that the mercury travels upward in the gage glass 74a is in direct proportion to the air pressure in chamber 52. As the travel of the piston 53 is limited, the pressure of air in the chamber 52 may not be in equilibrium with the pressure exerted upon said piston by the lever 41. In this case the piston will be forced upwardly until the valve stem 64 of valve 63 is engaged and forced upwardly opening said valve and permitting additional air from the air supply to enter chamber 52 until the pressure in said chamber equals the pressure exerted by lever 41 on the piston 53. Piston 53 will then move downward and permit valve 63 to close. During this time the mercury column in the gage glass has increased in height until the weight thereof attains equilibrium with the pressure in chamber 52 and the indicia on the scale 115 will then indicate from the said height the weight of the suspended load.

When the suspended load is reduced the air in chamber 52 expands and causes the piston 53 to move downwardly bringing the end of the stem 60 of valve 61 into engagement with the upper end of the set screw 59a and opening valve 61, permitting air to escape from the chamber 52 until equilibrium is established between the pressure within chamber 52 and the pressure exerted by the lever 41. During this time the column of mercury in gage glass 74a falls until its weight equals the pressure of air within chamber 52 and the scale 115 will then indicate the weight of the suspended load.

As the mercury rises within the gage glass 74a the air within said glass above the mercury column will be forced upwardly and will act to expand the bellows 113 thereby rocking the lever 111 and causing the pen 112 to travel across the chart 109 and, as said chart is being rotated by the motor 107, a record of the weight suspended is made. It will be understood that the air pressure in the main air supply will be constant at a point sufficient to always supply the necessary air to the chamber 52.

The handle and shaft 99 and 98 respectively, sheave wheel 100 and cable 101 are provided as a means for elevating the panel and gage glass at the initiation of the drilling to provide greater ease in reading the gage thereon, the panel being lowered as the drilling proceeds and the weight of the tool string increases, increasing the height of the mercury column.

Having described my invention what I claim is:

1. In an apparatus for the purpose described, a stationary, fluid operated load indicating gauge, a suspended actuator mounted for vertical travel in relation to and independent of said indicating gauge, said actuator comprising a housing, a pair of levers pivotally mounted in said housing, one above the other, the upper lever being supported at one end near the center of the housing and the lower lever being pivotally supported near one end near the side wall of said housing, the pivotal supports for said levers being positioned at relatively opposite ends, a pivotal connection between the free end of the upper lever and one end of the lower lever, an intermediate lever pivotally mounted at one end in said housing, a connection between the remaining end of the lower lever and the intermediate lever, a bell shaped cylinder, a diaphragm in said cylinder forming a fluid tight compartment in the upper end thereof, a piston in the lower end of said cylinder capable of movement vertically to flex said diaphragm and thereby vary the volume of said fluid compartment, a connection between said piston and said intermediate lever, a spring controlled outlet valve in said piston, adapted to be opened by engagement with said piston upon downward movement thereof, a spring controlled inlet valve in the top wall of said cylinder, adapted to be opened by engagement with said piston during its upward movement, a conduit connection from an air tight reservoir to the said inlet valve, a conduit connection from said upper compartment to said load indicating gauge, a yoke mounted in said housing, depending downwardly and supported upon the upper lever near its pivotal support, and there being a fluid under pressure in said reservoir, upper compartment, load indicating gauge and their conduit connections, so that any pressure exerted on said piston from said yoke may be transmitted to said load indicating gauge.

2. A weight indicating device for well drilling apparatus comprising a housing suspended from a suitable support, a bell-shaped cylinder, a diaphragm covering the lower end of said cylinder and secured thereto thus forming an airtight compartment in said cylinder, a piston being adapted to bear against said diaphragm and arranged for upward and downward movement thus bending said diaphragm and thereby decreasing or increasing the volume of said compartment, a self closing inlet valve in the top wall of said capsule, means provided to cause said valve to be opened by said piston when it moves a certain distance upward, an air tight container connected by a conduit to said inlet valve, and there being a fluid under pressure in said container, the opening of said inlet valve permitting said fluid to enter said compartment in said capsule, a self closing exhaust valve in said piston, means provided whereby said exhaust valve shall be opened by downward movement of said piston to permit fluid under pressure in said capsule to escape to the atmosphere, a pressure gauge connected by a conduit to said capsule compartment to indicate the pressure of the fluid in said capsule, and means interposed between the load and said piston for moving the same, said means comprising, a lever rockably mounted at one end in said housing with its free end projecting beneath said piston, a connection from said free end of said lever to said piston whereby movement of said end will move said piston, a lower lever rockably mounted intermediate its ends in said housing in vertical alinement with said first lever and below the same, means connecting one of the ends of the lower lever to said first lever, an upper lever pivotally mounted at one end in said housing, means connecting the free end of said upper lever to the remaining end of said lower lever and a yoke mounted on said upper lever near its pivoted end from which the load is suspended.

3. In a device of the character described, an actuator interposed between a supporting element and a weight or load to be measured and carrying said load, said actuator comprising substantially, a housing, a flat capsule mounted in said housing, said capsule being divided into an inner and outer compartment by a flexible diaphragm, a said outer compartment including an annular member secured to the body of the capsule in a manner to hold said diaphragm and make an air-tight chamber of the inner compartment; a piston composed of a center stud and a plurality of segmental leaves whose outer edges are connected to said annular member and whose inner edges are connected to said center stud in a manner to give support to the flexible diaphragm yet allow the center of said piston freedom to move a distance inward or outward relative to said inner compartment, thereby decreasing or increasing the volume of said inner compartment respectively; means to convey a portion of said load to said center stud; a conduit means including a valve adapted to be opened by contact with center stud when the piston has traveled a desired distance inward, relative to said inner compartment to admit to said inner compartment, fluid under pressure from a suitable container connected by said conduit means to said inner compartment; a second conduit means including a valve adapted to be opened by contact with said center stud when said piston has moved a desired distance outward, relative to said inner compartment for permitting fluid under pressure in said inner compartment to escape to the atmosphere; a pressure gauge connected to said inner compartment to indicate the pressure therein.

WATSON L. HAWK.